United States Patent
Choubal et al.

(10) Patent No.: US 7,761,529 B2
(45) Date of Patent: Jul. 20, 2010

(54) METHOD, SYSTEM, AND PROGRAM FOR MANAGING MEMORY REQUESTS BY DEVICES

(75) Inventors: Ashish V. Choubal, Austin, TX (US); Madhu R. Gumma, Austin, TX (US); Christopher T. Foulds, Austin, TX (US); Mohannad M. Noah, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1617 days.

(21) Appl. No.: 10/882,560

(22) Filed: Jun. 30, 2004

(65) Prior Publication Data

US 2006/0018330 A1    Jan. 26, 2006

(51) Int. Cl.
  *H04L 29/06* (2006.01)
(52) U.S. Cl. .............. 709/212; 709/253; 370/351; 370/463; 710/27; 711/E12.067; 711/154
(58) Field of Classification Search .......... 709/212, 709/253; 710/27; 711/E12.067, 154; 370/463
   See application file for complete search history.

(56) References Cited

U.S. PATENT DOCUMENTS

| | | | | |
|---|---|---|---|---|
| 4,534,011 | A * | 8/1985 | Andrews et al. | 710/58 |
| 6,333,929 | B1 * | 12/2001 | Drottar et al. | 370/362 |
| 6,425,021 | B1 * | 7/2002 | Ghodrat et al. | 710/22 |
| 6,996,070 | B2 * | 2/2006 | Starr et al. | 370/252 |
| 7,010,607 | B1 * | 3/2006 | Bunton | 709/228 |
| 7,114,096 | B2 * | 9/2006 | Freimuth et al. | 714/13 |
| 7,249,227 | B1 * | 7/2007 | Pittman | 711/154 |
| 7,260,631 | B1 * | 8/2007 | Johnson et al. | 709/224 |
| 7,281,030 | B1 * | 10/2007 | Davis | 709/212 |
| 7,298,749 | B2 * | 11/2007 | Biran et al. | 370/395.42 |
| 7,324,540 | B2 * | 1/2008 | Vangal et al. | 370/419 |
| 7,376,755 | B2 * | 5/2008 | Pandya | 709/250 |
| 7,400,639 | B2 * | 7/2008 | Madukkarumukumana et al. | 370/429 |
| 7,437,738 | B2 * | 10/2008 | Shah et al. | 719/321 |
| 2002/0007420 | A1 * | 1/2002 | Eydelman et al. | 709/235 |
| 2002/0165992 | A1 * | 11/2002 | Banerjee | 709/315 |
| 2004/0196064 | A1 * | 10/2004 | Garlepp et al. | 326/30 |
| 2004/0199808 | A1 * | 10/2004 | Freimuth et al. | 714/4 |
| 2004/0210320 | A1 * | 10/2004 | Pandya | 700/1 |
| 2004/0230743 | A1 * | 11/2004 | Ware et al. | 711/115 |
| 2005/0030972 | A1 * | 2/2005 | Madukkarumukumana et al. | 370/463 |
| 2005/0060442 | A1 * | 3/2005 | Beverly et al. | 710/33 |
| 2005/0100042 | A1 * | 5/2005 | Illikkal | 370/463 |
| 2005/0102682 | A1 * | 5/2005 | Shah et al. | 719/321 |

(Continued)

OTHER PUBLICATIONS

Senapthi et al., "Introduction to TCP Offload Engines" Network and Communications, 2003, pp. 103-107.*

(Continued)

*Primary Examiner*—Alina N. Boutah
(74) *Attorney, Agent, or Firm*—Konrad Raynes & Victor LLP

(57) ABSTRACT

Provided are a method, system, and program for managing memory requests for logic blocks or clients of a device. In one embodiment, busses are separated by the type of data to be carried by the busses. In another aspect, data transfers are decoupled from the memory requests which initiate the data transfers. In another aspect, clients competing for busses are arbitrated and selected memory requests may be provided programmable higher priority than other memory operations of a similar type.

48 Claims, 12 Drawing Sheets

U.S. PATENT DOCUMENTS

| | | | |
|---|---|---|---|
| 2005/0122986 A1* | 6/2005 | Starr et al. | 370/412 |
| 2005/0141425 A1* | 6/2005 | Foulds | 370/235 |
| 2005/0144402 A1* | 6/2005 | Beverly | 711/152 |
| 2005/0223118 A1* | 10/2005 | Tucker et al. | 709/250 |
| 2006/0010264 A1* | 1/2006 | Rader et al. | 710/23 |
| 2006/0067346 A1* | 3/2006 | Tucker et al. | 370/412 |
| 2006/0168281 A1* | 7/2006 | Starr et al. | 709/230 |
| 2008/0037555 A1* | 2/2008 | Biran et al. | 370/395.42 |
| 2008/0140857 A1* | 6/2008 | Conner et al. | 709/236 |

OTHER PUBLICATIONS

American National Standards Institute, "Fibre Channel Framing and Signaling (FC-FS)", 1.90, Apr. 9, 2003, 64 pp.

IEEE Computer Society, "IEEE Standard for Information Technology- 802.3", Mar. 8, 2002, 33 pp.

Information Sciences Institute, "Internet Protocol", Darpa Internet Program Protocol Specification, RFC: 791, Sep. 1981, 44 pp.

Information Sciences Institute, "Transmission Control Protocol", Darpa Internet Program Protocol Specification, RFC: 793, Sep. 1981, 80 pp.

PCI Special Interest Group, "PCI Local Bus Specification", Revision 2.3, Mar. 29, 2002, 328 pp.

Postel, J., "User Datagram Protocol", RFC 768, Aug. 28, 1980, 3 pp.

RDMA Consortium, "Architectural Specifications for RDMA over TCP/IP", [online] 2005, [Retrieved on Dec. 22, 2005], retrieved from the Internet at <URL: http://www.rdmaconsortium.org/home>, 1 pg.

* cited by examiner

| Round Robin State | ←——————— Priority ———————→ | | | |
|---|---|---|---|---|
| A | Request 1A | Request 1B | Request 1C | Request 1D |
| B | Request 1B | Request 1C | Request 1D | Request 1A |
| C | Request 1C | Request 1D | Request 1A | Request 1B |
| D | Request 1D | Request 1A | Request 1B | Request 1C |

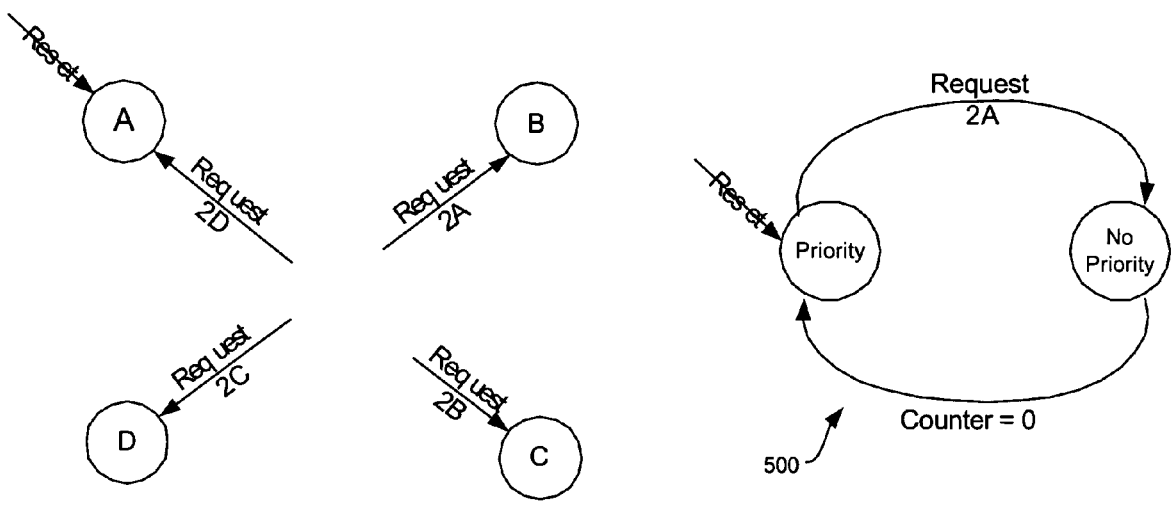

| Round Robin State | Request 2A Priority State | Priority | | | |
|---|---|---|---|---|---|
| A | No Priority | Request 2A | Request 2B | Request 2C | Request 2D |
| B | No Priority | Request 2B | Request 2C | Request 2D | Request 2A |
| C | No Priority | Request 2C | Request 2D | Request 2A | Request 2B |
| D | No Priority | Request 2D | Request 2A | Request 2B | Request 2C |
| A | Priority | Request 2A | Request 2B | Request 2C | Request 2D |
| B | Priority | Request 2A | Request 2B | Request 2C | Request 2D |
| C | Priority | Request 2A | Request 2C | Request 2D | Request 2B |
| D | Priority | Request 2A | Request 2D | Request 2B | Request 2C |

FIG. 12b

| Round Robin State | ←——————— Priority ———————— |  |  |  |  |
|---|---|---|---|---|---|
| 1 | Group 3 Request 3A | Group 2 Request 2A | Group 1 Request | Group 2 Request | Group 3 Request |
| 2 | Group 2 Request 2A | Group 3 Request 3A | Group 2 Request | Group 3 Request | Group 1 Request |
| 3 | Group 3 Request 3A | Group 2 Request 2A | Group 3 Request | Group 1 Request | Group 2 Request |

METHOD, SYSTEM, AND PROGRAM FOR MANAGING MEMORY REQUESTS BY DEVICES

DESCRIPTION OF RELATED ART

In a network environment, a network adapter on a host computer, such as an Ethernet controller, Fibre Channel controller, etc., will receive Input/Output (I/O) requests or responses to I/O requests initiated from the host. Often, the host computer operating system includes a device driver to communicate with the network adapter hardware to manage I/O requests to transmit over a network. The host computer may also employ a protocol which packages data to be transmitted over the network into packets, each of which contains a destination address as well as a portion of the data to be transmitted. Data packets received at the network adapter are often stored in a packet buffer in the host memory. A transport protocol layer can process the packets received by the network adapter that are stored in the packet buffer, and access any I/O commands or data embedded in the packet.

For instance, the computer may employ the TCP/IP (Transmission Control Protocol and Internet Protocol) to encode and address data for transmission, and to decode and access the payload data in the TCP/IP packets received at the network adapter. IP specifies the format of packets, also called datagrams, and the addressing scheme. TCP is a higher level protocol which establishes a connection between a destination and a source. Another protocol, Remote Direct Memory Access (RDMA) establishes a higher level connection and permits, among other operations, direct placement of data at a specified memory location at the destination A device driver, application or operating system can utilize significant host processor resources to handle network transmission requests to the network adapter. One technique to reduce the load on the host processor is the use of a TCP/IP Offload Engine (TOE) in which TCP/IP protocol related operations are embodied in the network adapter hardware as opposed to the device driver or other host software, thereby saving the host processor from having to perform some or all of the TCP/IP protocol related operations.

Information describing a particular network connection may be stored in a data structure referred to herein as a network connection context. Typically, a TOE may have several different types of memory requests or commands which define various memory operations involving such network connection contexts. Each memory request or command type is generated by a component or logic block within the TOE which may be thought of as a TOE "client." Thus, for example, a TOE may have a TCP receive (TCP_RX) client which generates a memory request or command involving a network connection context. The information contained within network connection contexts may be accessed a number of times by the TOE clients for each packet processed by the TOE.

In addition to a network connection context command, a TOE client may generate a memory request or command involving data packets. Thus, for example, a TOE may have a TCP receive (TCP_RX) client which generates a data packet command.

FIG. 1 shows an example of a prior art memory access architecture for a TOE in which a memory controller 10 resides between the clients 12a, 12b . . . 12n of the TOE device and an external memory 14 which may be system memory or other external memory. Typically, a bidirectional data bus 16 couples each of the clients 12a, 12b . . . 12n to the memory controller 10 which is coupled to the memory 14 by a bidirectional data bus 18. The bidirectional bus 16 is usually a tri-state bus which often can be accessed by only one client of the clients 12a, 12b . . . 12n at a time. In addition, a client is typically limited to performing either a read operation or a write operation at any one time, but not both at the same time.

The memory controller 10 arbitrates the various memory access operations initiated by the clients 12a, 12b . . . 12n with respect to the memory 14. Typically, the memory controller 10 has a predefined arbitration scheme which determines which client is permitted memory access when more than one client attempts to access the memory 14 at a time. Once a memory operation is completed, the memory controller 10 selects one of the clients 12a, 12b . . . 12n (either a different or the same client) in accordance with the predefined scheme, to access the memory 10 to perform another memory operation. In some applications, the memory controller 10 may include a cache to reduce memory access latencies.

FIG. 2 shows operations of a TOE client interacting with a prior art memory controller such as the memory controller 10 of FIG. 1. When issuing (block 30) to the memory controller 10 a request for a memory operation, the client also typically issues (block 32) the data for that memory operation if it is a write operation. The memory controller 30 causes the client to wait (block 34) until the memory operation is executed before permitting the client to issue another memory request (block 30) and to issue the data for that subsequent request (block 32).

Notwithstanding, there is a continued need in the art to improve the performance of memory usage in data transmission and other operations.

BRIEF DESCRIPTION OF THE DRAWINGS

Referring now to the drawings in which like reference numbers represent corresponding parts throughout:

FIGS. 12a and 12b are schematic representations of the operations of another example of a state machine of FIG. 10b in accordance with one embodiment;

DETAILED DESCRIPTION OF ILLUSTRATED EMBODIMENTS

In the following description, reference is made to the accompanying drawings which form a part hereof and which illustrate several embodiments of the present disclosure. It is understood that other embodiments may be utilized and structural and operational changes may be made without departing from the scope of the present description.

Figure 3:
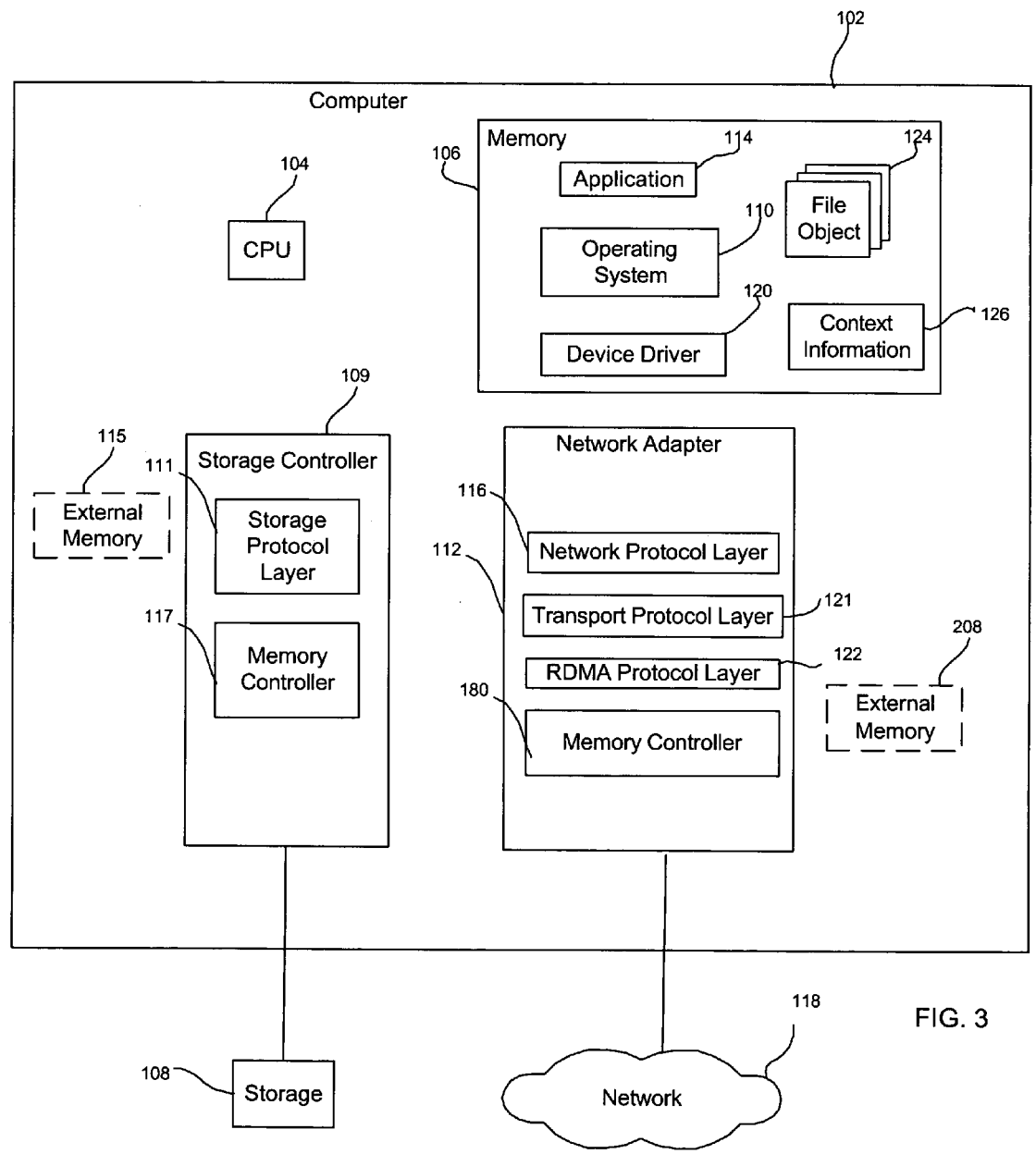
FIG. 3 illustrates one embodiment of a computing environment in which aspects of the description provided herein are employed.

FIG. 3 illustrates a computing environment in which aspects of described embodiments may be employed. A computer 102 includes one or more central processing units (CPU) 104 (only one is shown), a memory 106, non-volatile storage 108, a storage controller 109, an operating system 110, and a network adapter 112. An application 114 further executes in memory 106 and is capable of transmitting and receiving packets from a remote computer. The computer 102 may comprise any computing device known in the art, such as a mainframe, server, personal computer, workstation, laptop, handheld computer, telephony device, network appliance, virtualization device, storage controller, storage controller, etc. Any CPU 104 and operating system 110 known in the art may be used. Programs and data in memory 106 may be swapped into storage 108 as part of memory management operations.

The storage controller 109 controls the reading of data from and the writing of data to the storage 108 in accordance with a storage protocol layer 111. The storage protocol of the layer 111 may be any of a number of known storage protocols including Redundant Array of Independent Disk (RAID), Serial Advanced Technology Attachment (SATA), Small Computer System Interface (SCSI) etc. The storage controller 109 may have an external memory 115. A memory controller 117 controls access to various memory such as the external memory 115.

The network adapter 112 includes a network protocol layer 116 to send and receive network packets to and from remote devices over a network 118. The network 118 may comprise a Local Area Network (LAN), the Internet, a Wide Area Network (WAN), Storage Area Network (SAN), etc. Embodiments may be configured to transmit data over a wireless network or connection, such as wireless LAN, Bluetooth, etc. In certain embodiments, the network adapter 112 and various protocol layers may employ the Ethernet protocol including Ethernet protocol over unshielded twisted pair cable, token ring protocol, Fibre Channel protocol, Infiniband, SATA, parallel SCSI, serial attached SCSI cable, etc., or any other network communication protocol known in the art.

A device driver 120 executes in memory 106 and includes network adapter 112 specific commands to communicate with a network controller of the network adapter 112 and interface between the operating system 110, applications 114 and the network adapter 112. The network controller can implement the network protocol layer 116 and can control other protocol layers including a data link layer and a physical layer which includes hardware such as a data transceiver.

In certain embodiments, the network controller of the network adapter 112 includes a transport protocol layer 121 as well as the network protocol layer 116. For example, the network controller of the network adapter 112 can include a TOE, in which many transport layer operations can be performed within the network adapter 112 hardware or firmware, as opposed to the device driver 120 or other host software.

The transport protocol operations include packaging data in a TCP/IP packet with a checksum and other information and sending the packets. These sending operations are performed by an agent which may include a TOE, a network interface card or integrated circuit, a driver, TCP/IP stack, a host processor or a combination of these elements. The transport protocol operations also include receiving a TCP/IP packet from over the network and unpacking the TCP/IP packet to access the payload data. These receiving operations are performed by an agent which, again, may include a TOE, a driver, a host processor or a combination of these elements.

The network layer 116 handles network communication and provides received TCP/IP packets to the transport protocol layer 121. The transport protocol layer 121 interfaces with the device driver 120 or operating system 110 or an application 114, and performs additional transport protocol layer operations, such as processing the content of messages included in the packets received at the network adapter 112 that are wrapped in a transport layer, such as TCP and/or IP, the Internet Small Computer System Interface (iSCSI), Fibre Channel SCSI, parallel SCSI transport, or any transport layer protocol known in the art. The transport protocol layer 121 can unpack the payload from the received TCP/IP packet and transfer the data to the device driver 120, an application 114 or the operating system 110.

In certain embodiments, the network adapter 112 can further include an RDMA protocol layer 122 as well as the transport protocol layer 121. For example, the network controller of the network adapter 112 can include a Remote Direct Memory Access RDMA enabled Network Interface Card (RNIC), in which RDMA layer operations are performed within the network adapter 112 hardware, as opposed to the device driver 120 or other host software. Thus, for example, an application 114 transmitting messages over an RDMA connection can transmit the message through the device driver 120 and the RDMA protocol layer 122 of the network adapter 112. The data of the message can be sent to the transport protocol layer 121 to be packaged in a TCP/IP packet before transmitting it over the network 118 through the network protocol layer 116 and other protocol layers including the data link and physical protocol layers.

The memory 106 further includes file objects 124, which also may be referred to as socket objects, which include information on a connection to a remote computer over the network 118. The application 114 uses the information in the file object 124 to identify the connection. The application 114 uses the file object 124 to communicate with a remote system. The file object 124 may indicate the local port or socket that will be used to communicate with a remote system, a local network (IP) address of the computer 102 in which the application 114 executes, how much data has been sent and received by the application 114, and the remote port and network address, e.g., IP address, with which the application 114 communicates. Context information 126 comprises a data structure including information the device driver 120, operating system 110 or an application 114, maintains to manage requests sent to the network adapter 112 as described below.

In the illustrated embodiment, the CPU 104 programmed to operate by the software of memory 106 including one or more of the operating system 110, applications 114, and device drivers 120 provides a host which interacts with the network adapter 112. A host may be embodied in a variety of devices such as a host computer 102 or other devices. In the illustrated embodiment, a data send and receive agent includes the transport protocol layer 121 and the network protocol layer 116 of the network interface 112. However, the data send and receive agent may include a TOE, a network interface card or integrated circuit, a driver, TCP/IP stack, a host processor or a combination of these elements. The network controller may comprise hardware, software, firmware or any combination of these elements.

Figure 4:
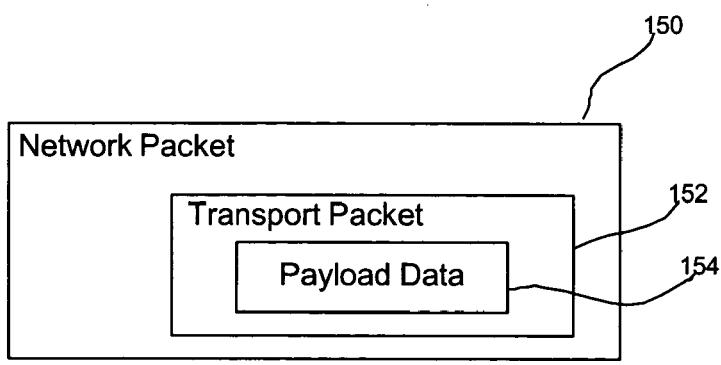
FIG. 4 illustrates a prior art packet architecture.

FIG. 4 illustrates a format of a network packet 150 received at or transmitted by the network adapter 112. The network packet 150 has a format understood by the network protocol layer 116, such as the IP protocol. The network packet 150 may include an Ethernet frame that includes additional Ethernet components, such as a header and error checking code (not shown). A transport packet 152 is included in the network packet 150. The transport packet 152 is capable of being processed by the transport protocol layer 121, such as the TCP protocol. The packet may be processed by other layers in accordance with other protocols including Internet Small Computer System Interface protocol, Fibre Channel SCSI, parallel SCSI transport, etc. The transport packet 152 includes payload data 154 as well as other transport layer fields, such as a header and an error checking code. The payload data 152 includes the underlying content being transmitted, e.g., commands, status and/or data. The driver 120, operating system 110 or an application 114 may include a layer, such as a SCSI driver or layer, to process the content of the payload data 154 and access any status, commands and/or data therein.

Figure 5:
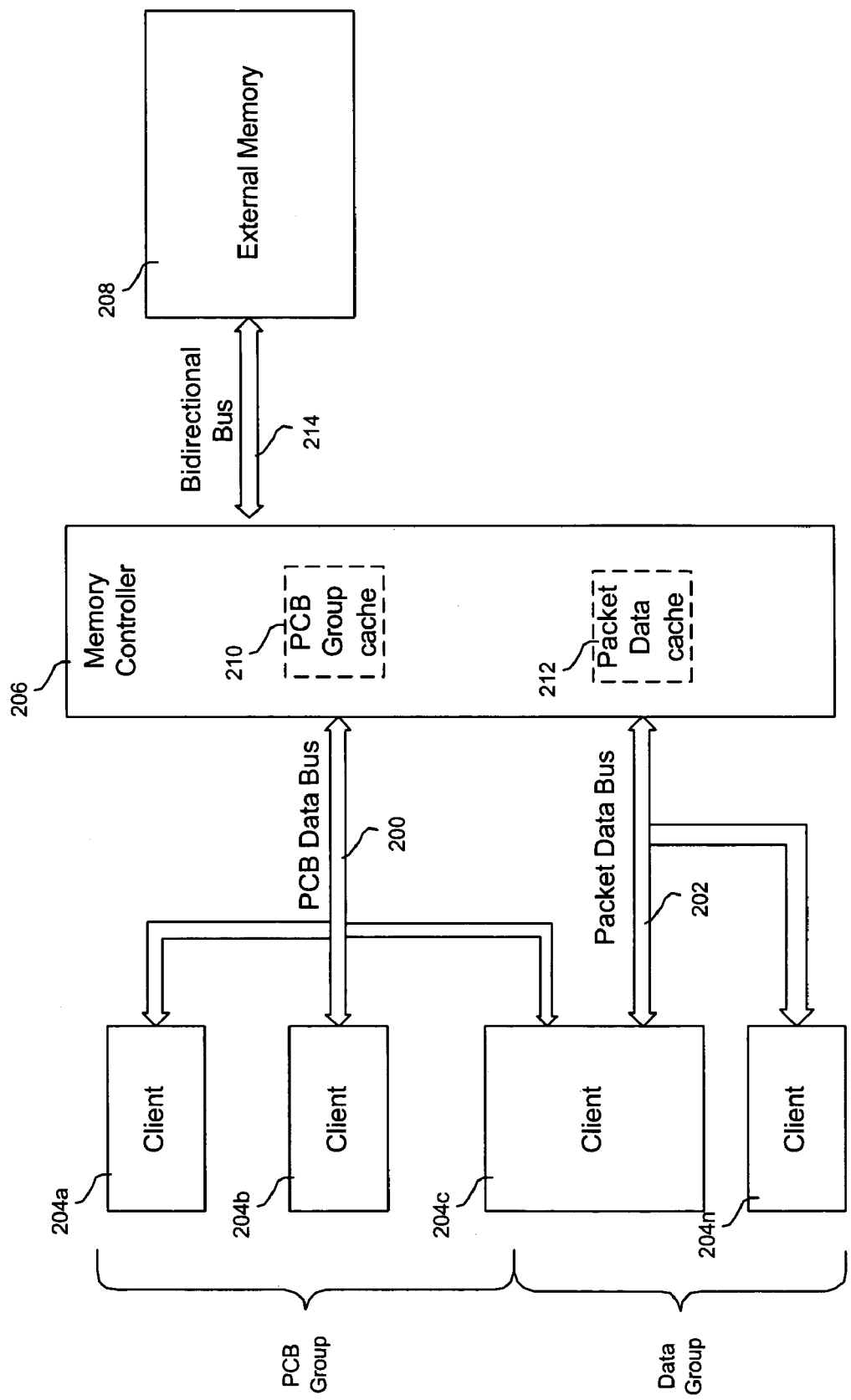
FIG. 5 illustrates an example of a memory system architecture for an I/O device such as a network adapter in accordance with one embodiment of the present description.

In accordance with one aspect of the description provided herein, a memory access architecture for an I/O device such as a TOE enabled network adapter 112 has a first data bus 200 for network connection context data, and a second data bus 202 for packet data as shown in FIG. 5. In the illustrated embodiment, a network connection context is referred to herein as a Protocol Control Block (PCB). The PCB data bus 200 is separate from the packet data bus 202, and couples a first group of clients, represented by clients 204a, 204b, and 204c, to a memory controller 206 which controls access of the clients 204a, 204b . . . 204n to memory as represented by a memory 208. The memory 208 may include system memory 106 or other external memory. The memory 208 is coupled to the memory controller 206 of the network adapter 112 by a bidirectional bus 214.

The first group of clients 204a, 204b and 204c, referred to herein as the PCB Group clients, issue memory operations, including read and write operations, involving one or more PCB's in connection with data transmission or reception by the network adapter 112. Thus, the PCB data being read or written by the PCB Group of clients passes over the PCB data bus 200. For simplicity's sake, the PCB Group is represented by the three clients 204a, 204b, 204c. However, the actual number of clients in a PCB group may be in accordance with the number of clients which issue memory operations, including read and write operations, involving one or more PCB's or other network connection context data. For example, the PCB Group may include transport protocol layer clients such as TCP, User Datagram Protocol (UDP) clients which access network connection context data. Other network connection context groups in other applications may have more or fewer or different clients.

The second group of clients 204c . . . 204n, referred to herein as the Packet Data Group clients, issue memory operations, including read and write operations, involving packet data in connection with data transmission or reception by the network adapter 112. Thus, the packet data being read or written by the Packet Data Group of clients passes over the Packet Data bus 202. For simplicity's sake, the Packet Data Group is represented by the clients 204c . . . 204n. However, the actual number of clients in a Packet Data Group may be in accordance with the number of clients which issue memory operations, including read and write operations, involving packet data or other data. For example, the Packet Data Group may include transport protocol clients such as TCP, IP and UDP client which store or modify packet data. Other packet data groups in other applications may have more or fewer or different clients.

In accordance with another aspect, the memory controller 206 maintains a first cache 210, referred to herein as the PCB cache 210, for network connection context data, and a second cache 212, referred to herein as the Packet Data cache 212, for packet and other data. It is believed that, in some applications, the memory usage characteristics of network connection context data and packet data are substantially dissimilar. Thus, it is believed that having separate data buses 200, 202 and caches 210, 212 for network connection context data and packet data, can significantly increase memory operation efficiency in a variety of applications.

It is believed that prior art microprocessors utilize a cache for instructions and a separate cache for data.

Figure 1:
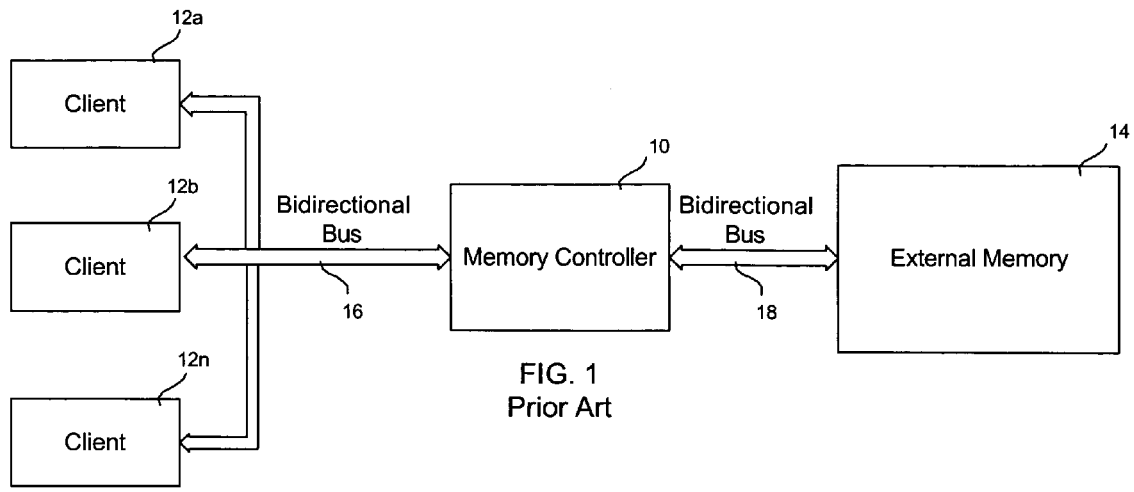
FIG. 1 illustrates prior art bus architecture for a memory system for a network adapter in a computer system.
Figure 6:
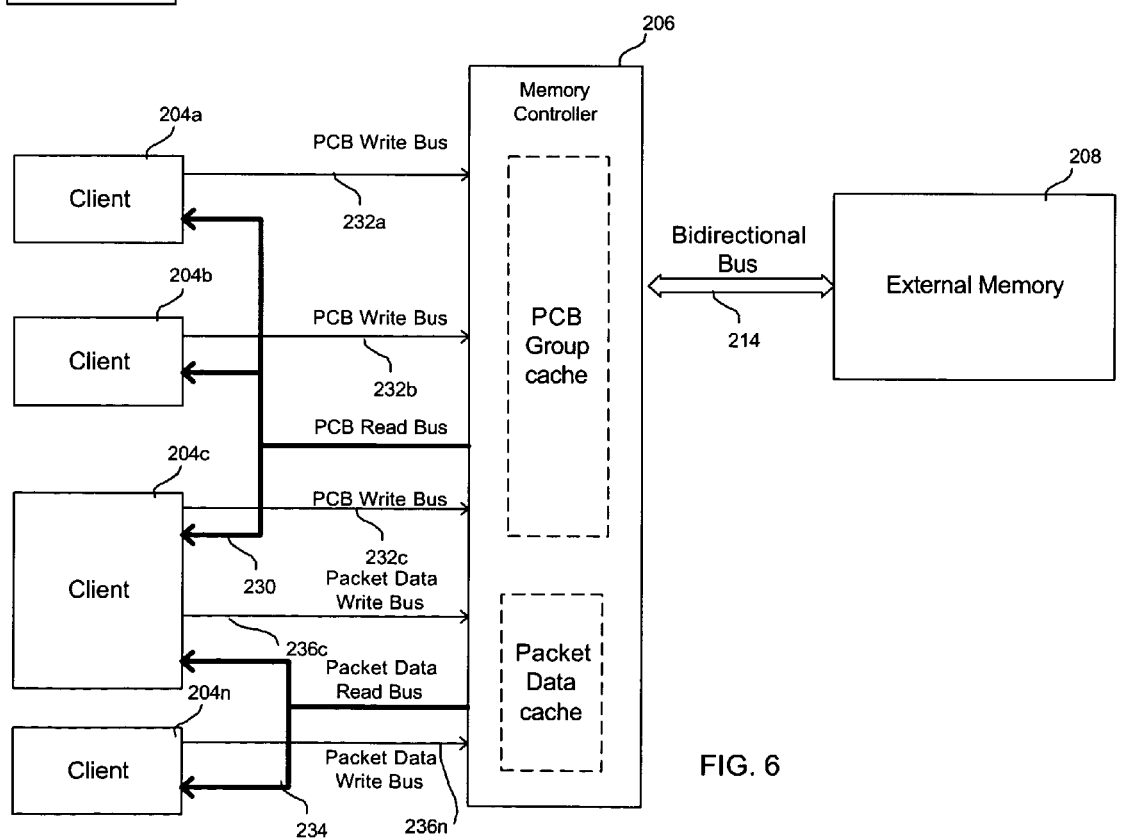
FIG. 6 illustrates a more detailed example of the memory system architecture of FIG. 5.
Figure 2:
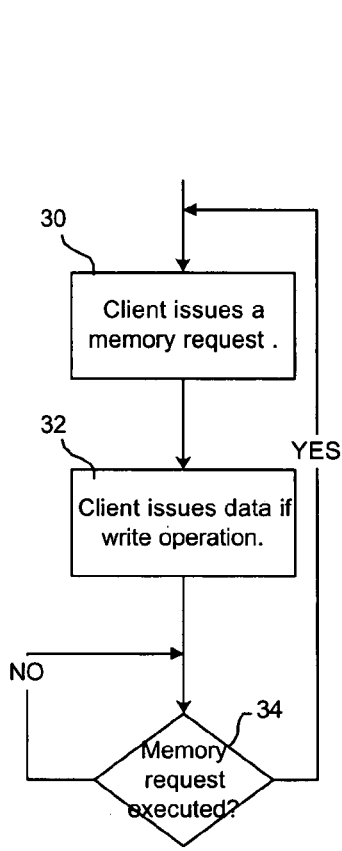
FIG. 2 illustrates operations of a prior art system memory controller for the architecture of FIG. 1.

In one embodiment illustrated in FIG. 6, the PCB bus 200 is split into a PCB data read bus 230 coupled to each of the PCB Group clients 204a, 204b, 204c and a plurality of PCB data write busses 232a, 232b and 232c, each of which is coupled to one of the of PCB data write busses 232a, 232b and 232c. In a similar fashion, the Packet Data bus 202 is split into a Packet Data read bus 234 coupled to each of the Packet Data Group clients 204c . . . 204n, and a plurality of Packet data write busses 236c . . . 236n, each of which is coupled to one of the Packet Data Group clients 204c . . . 204n.

Thus, in the illustrated embodiment, there can be as many as four different data busses coupled to any given TOE client. For example, the TOE client 204c is shown coupled to the PCB write bus 232c, the PCB Read bus 234, the Packet Data Read bus 234, and the Packet Data Write bus 236c. In the illustrated embodiment, all of the PCB and Packet Data read and write buses are each unidirectional. As a result, in some applications, if a read data operation is independent of a write operation, the read operation from one source can occur at the same time as a write operation to a different destination. It is appreciated that in some applications, bidirectional busses may be used as well.

As previously mentioned, in known prior art architectures for a device such as a TOE, once a client issues a request to the memory along with the data to be transferred, the client typically waits until the request is executed by the memory before the client is permitted to issue another request. In accordance with another aspect of the description provided herein, a memory request may be decoupled from the data transfer.

Figure 7:
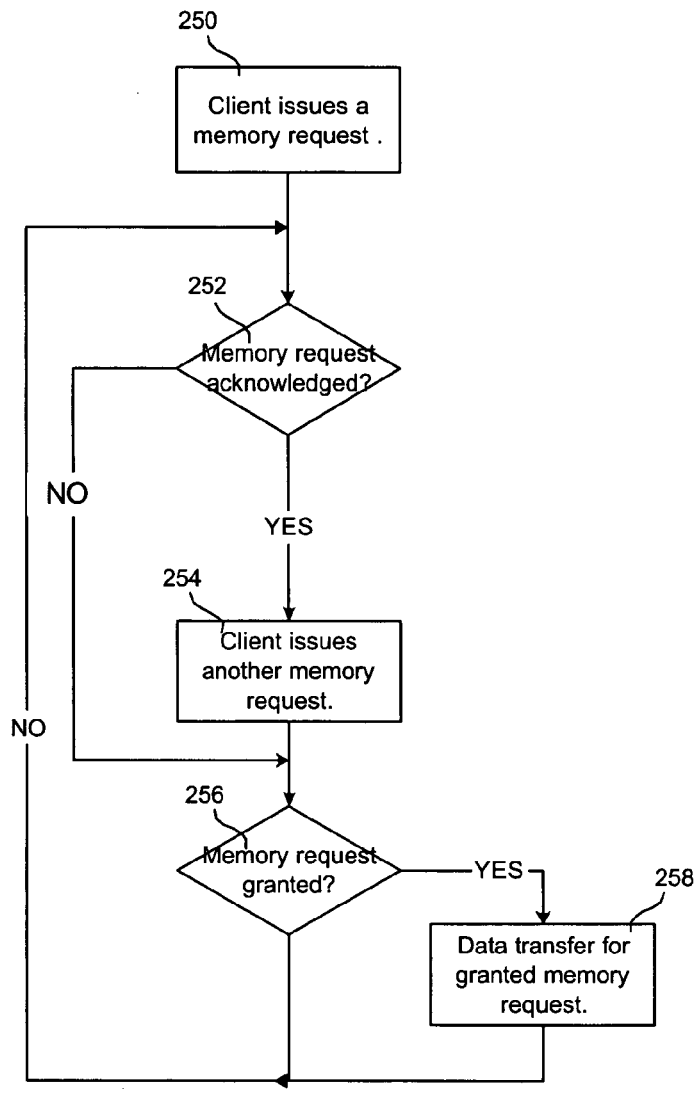
FIG. 7 illustrates one embodiment of operations of a memory system in which memory requests are decoupled from the data transfers associated with the memory requests in accordance with one embodiment of the present description.

For example, FIG. 7 shows operations of a client such as one of the TOE clients 204a . . . 204n interacting with a memory controller such as the memory controller 206. In this example, a client 204c issues (block 250) a memory operation request such as a PCB write operation request. However, the client 204c does not issue the PCB write data at this time. Instead, the client 204c waits (block 252) for an acknowledgment from the memory controller 206. Once the client 204c receives the acknowledgment, the client 204c issues (block 254) another memory operation request.

Once the target memory is ready for the data transfer portion of the memory operation from the client 204c, a grant signal (block 256) is given to the client 204c, so that the client 204c can transfer (block 258) the data in a write operation or receive the data in a read operation. On the other hand, if the target memory is not ready (block 256) for the data transfer, the client 204c waits (block 252) for an acknowledgment of an unacknowledged memory operation from the memory controller 206. Once the client 204c receives the acknowledgment, the client 204c can issue (block 254) another memory operation request. In this manner, requests from the client 204c can be pipelined to increase memory operation efficiency in many applications.

Moreover, execution of memory operations may occur in parallel with the pipelining of the memory operation requests. In the illustrated embodiment, while waiting (block 252) for an acknowledgment of a memory operation request, the client 204c can determine (block 256) if the memory controller 106 is ready to grant a prior memory operation already in the pipeline. Each of the other TOE clients 204a . . . 204n may operate in conjunction with the memory controller 106 in a similar fashion to pipeline memory requests while awaiting execution of memory operations within the pipeline.

Figure 8:
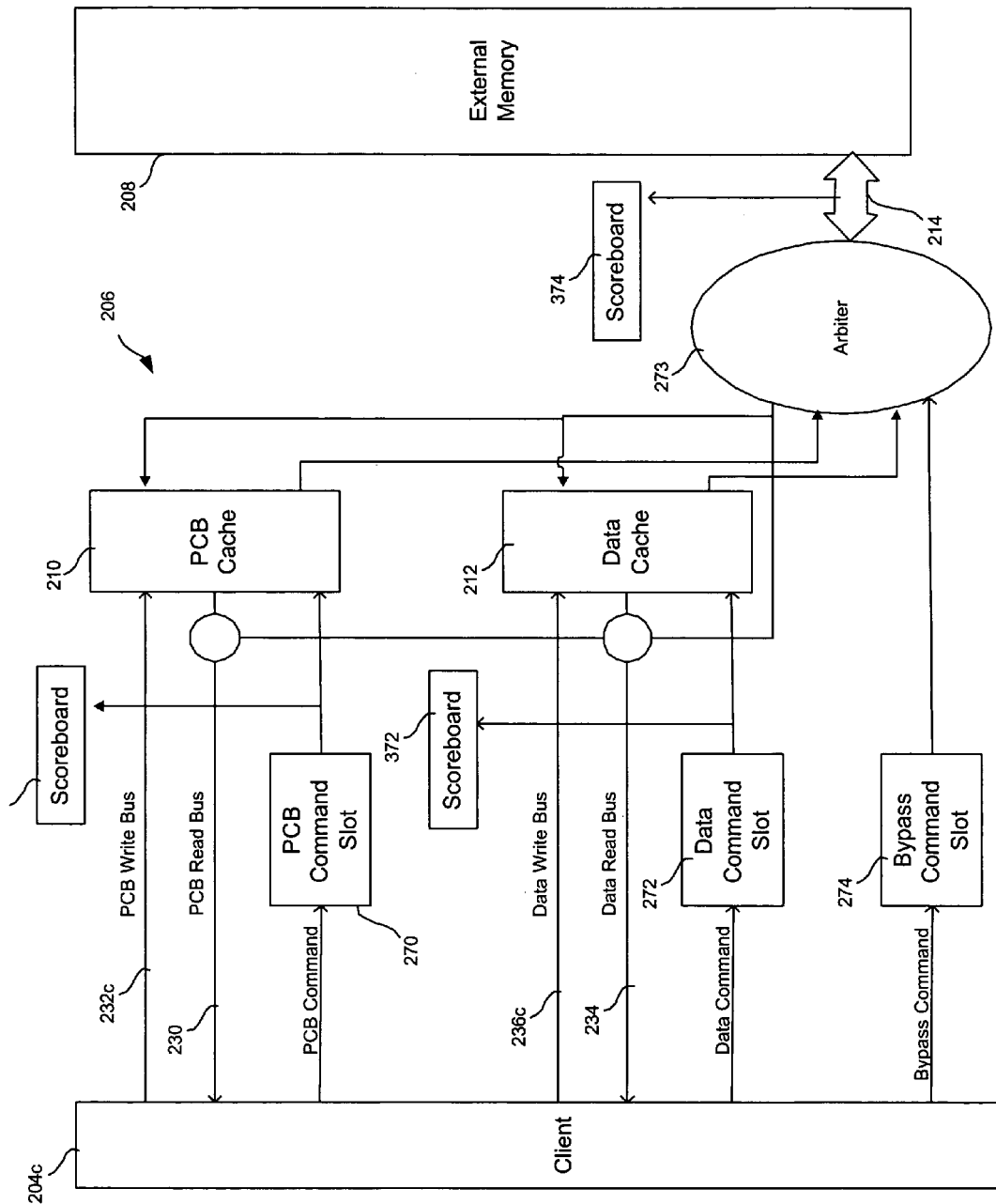
FIG. 8 illustrates one example of a parallel pipeline architecture for a memory controller of the memory system of FIG. 6.

FIG. 8 illustrates the architecture of FIG. 6 in greater detail for a representative client which is client 204c in the example of FIG. 8. As previously mentioned, the PCB data traffic and the packet data traffic are routed on separate busses such that data carried by a particular bus is arranged as a function of the type of memory requests grouped together for that bus. In addition, each type of memory requests may be pipelined in a separate pipeline. For example, the PCB type of memory requests are stored in a slot 270 which includes one or more registers for storing the pipeline of PCB memory requests from the client 204c as well as the other PCB type clients of the TOE. In a similar manner, the Packet Data type of memory requests are stored in a slot 272 which includes one or more registers for storing the pipeline of Packet Data type memory requests from the client 204c as well as the other Packet Data type clients of the TOE.

In the illustrated embodiment, the PCB type commands may be applied to the PCB cache 210 to obtain PCB read data or to write PCB data. Also, the PCB type commands may be applied to the external memory 208 via an arbiter 273. In a similar fashion, the Packet Data type commands may be applied to the Packet Data cache 212 to obtain Packet read data or to write Packet data. Also, the Packet Data type commands may be applied to the external memory 208 via the arbiter 273. In the illustrated embodiment, a third slot 274 may be used to store a pipeline of memory operations that are directed directly through the arbiter 273 to the external memory 208 without accessing a cache. These memory operations are referred to herein as "Bypass" type operations.

Figure 9:
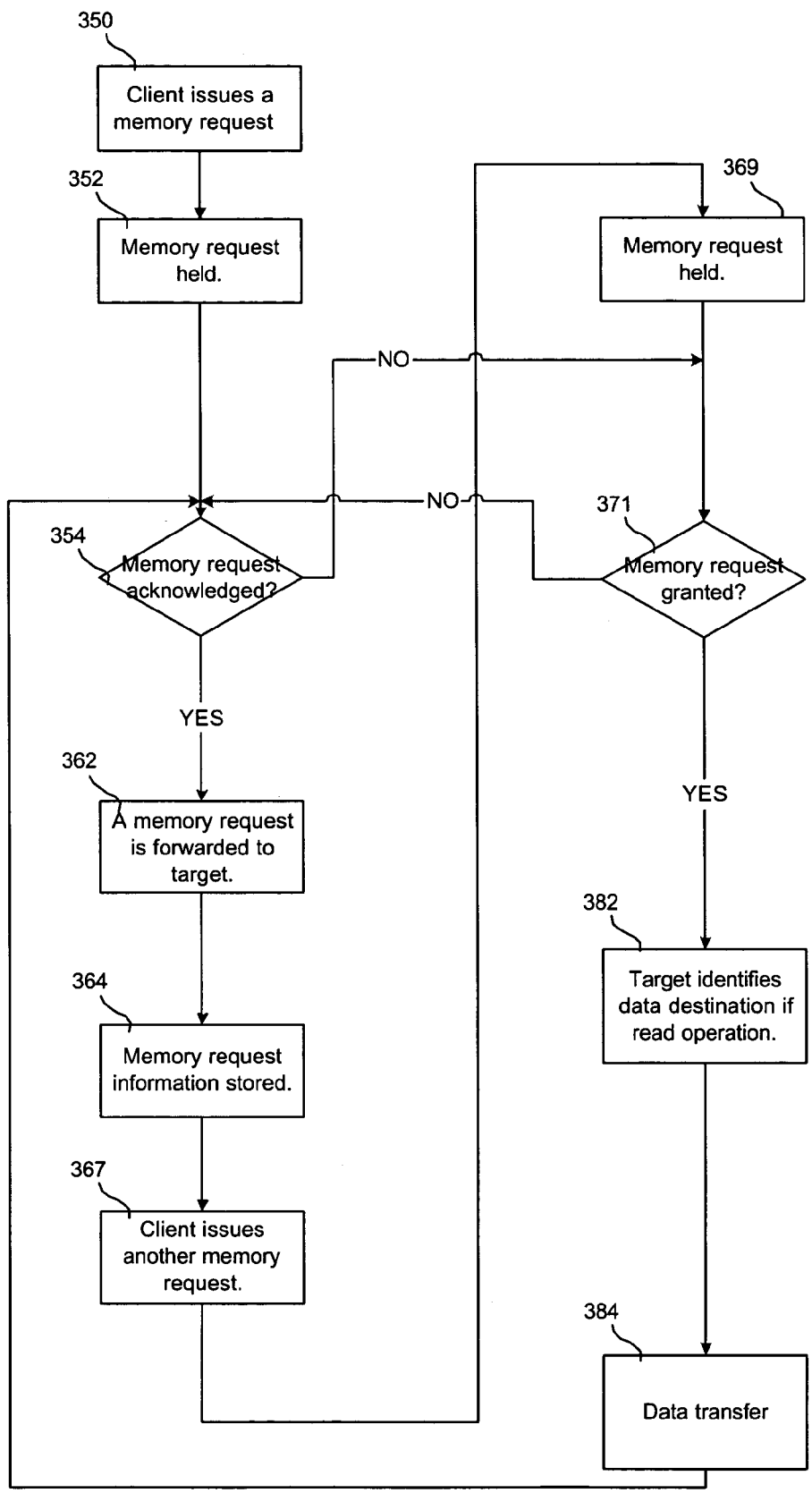
FIG. 9 illustrates one embodiment of operations of a memory controller to carry out memory requests in the architecture of the memory system of FIG. 8.

FIG. 9 shows a more detailed example of operations of a client such as one of the TOE clients 204a . . . 204n interacting with a memory controller such as the memory controller 206, to pipeline memory operations. In this example, a client 204c issues (block 350) a memory operation request such as a PCB write operation request. The memory request is held (block 352) in one of the slots 270, 272, 274, depending upon the type of memory operation as discussed above. The appropriate slot of the slots 270, 272, 274 stores the memory operations until the target, which is either the caches 210, 212 or the external memory 208, is ready to accept the memory operation.

In the illustrated embodiment, the number of memory operations that each slot of the slots 270, 272 can store is based on the number of memory operations that the associated cache 210, 212 can process at a time. For example, if the PCB cache 210 is single threaded and can only process one memory operation at a time, the number of entries which can be stored in the PCB command slot 270 may be limited to one memory operation entry at a time. Alternatively, if the PCB cache 210 is multi-threaded, the number of memory operation entries which may be stored at one time in the associated PCB command slot 270 may be selected to be more than one.

In this example, the client 204c waits (block 354) for an acknowledgment from the memory controller 206. The memory controller 206 issues the acknowledgment when the target memory, either the cache or external memory, is ready to accept the memory request stored in the slot. Upon issuance of the acknowledgment, the memory operation is forwarded (block 362) by the memory controller 206 to the appropriate target memory. In addition, information about the memory operation is stored (block 364) in a "scoreboard" memory 370, 372, 374 (FIG. 8). This information may include the type of operation and the identity of the requesting TOE client 204a, 204b . . . 204n. In the illustrated embodiment, each group of memory operations PCB, Packet Data and Bypass, has an associated scoreboard memory 370, 372, 374, respectively, for storing information about the memory operations in the pipeline of memory operations of that type.

In response to the acknowledgment, the client 204c is permitted to issue (block 367) another memory operation request. This subsequent memory request is again held (block 369) in one of the slots 270, 272, 274, depending upon its type of memory operation as discussed above.

Once the target memory is ready to accept the write data in a write operation or provide the read data in a read operation, a grant signal (block 371) is given to the client 204c. In the case of a read memory operation, when the target is ready to send the read data to the particular client which requested the read memory operation, the memory controller 206 reads the particular scoreboard memory 370, 372, 374 associated with the memory operation type and identifies (block 382) which of the clients 204a, 204b . . . 204n requested the memory read operation. The read data may then be transferred (block 384) to the requesting client which has been identified using the scoreboard memory for that memory operation type.

In the case of a write memory operation, when the target is ready (block 371) to accept the write data, the write data is sent (block 384) directly to the target from the client which requested the write memory operation. In some applications, the memory controller 206 can read the particular scoreboard memory 370, 372, 374 associated with the memory operation type to obtain information concerning the write operation to facilitate that operation.

In this manner, the transfer of data pursuant to a memory operation may be decoupled from the memory operation request which initiated the transfer. As a consequence, memory operation efficiency may be further improved. Each of the other TOE clients 204a . . . 204n may operate in conjunction with the memory controller 206 in a similar fashion to pipeline memory requests and to decouple memory operation requests from the data transfer operations associated with those requests.

In a number of applications, there may be a relatively large number of clients such as TOE clients contending for access to memory resources such as the caches 210, 212 and the memory 208, for example. In accordance with another aspect of the description provided herein, a multi level arbitration process is provided in which at one level, clients of each group or memory operation type compete for access to a memory resource assigned to that group. Thus, for example, the PCB Group of memory operations of the PCB type may compete for access to the PCB cache 210.

At a second level, a memory operation group competes for access to a memory resource available to other competing groups. Thus, for example, the Packet Data Group of memory operations of the Packet Data type may compete with the Bypass Group of memory operations of the Bypass type for access to the external memory 208.

In accordance with yet another aspect, the arbitration process permits access to memory resources to be granted on a programmable weighted priority basis. Memory requests may be separated into different classes of traffic, that is, high priority and low priority, for example. The different classes may be programmed to receive different percentages of the available bandwidth of the memory subsystem. Thus, for example, an IP Input Data client of the Packet Data Group may need more access to the cache 212 or the memory 208. Accordingly, the IP Input. Data Client may be provided a higher priority than some of the other Packet Data type clients of the Packet Data Group.

Figure 10A:
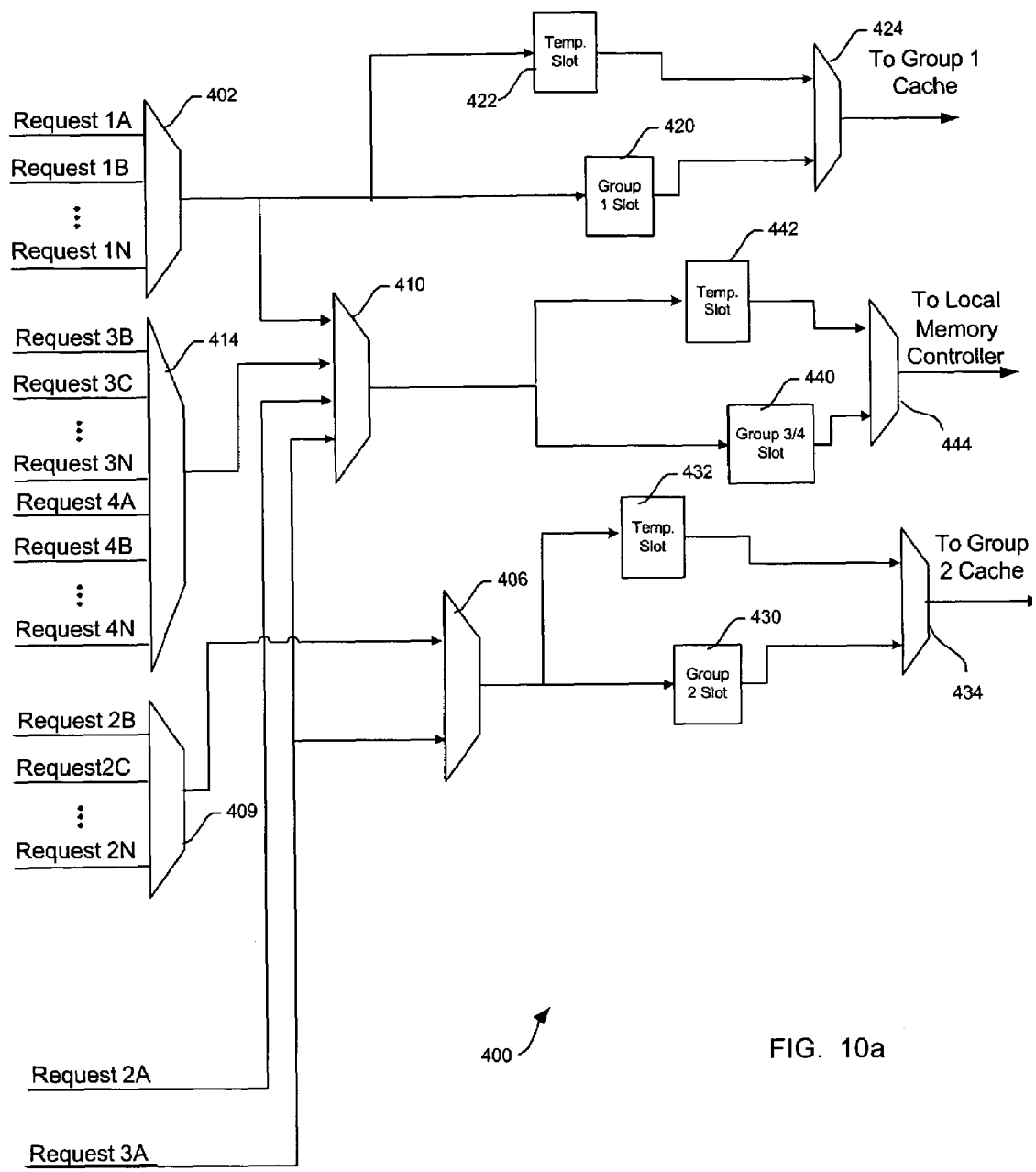
FIGS. 10a and 10b illustrate one embodiment of arbitration logic for the pipeline architecture of FIG. 8.
Figure 10B:
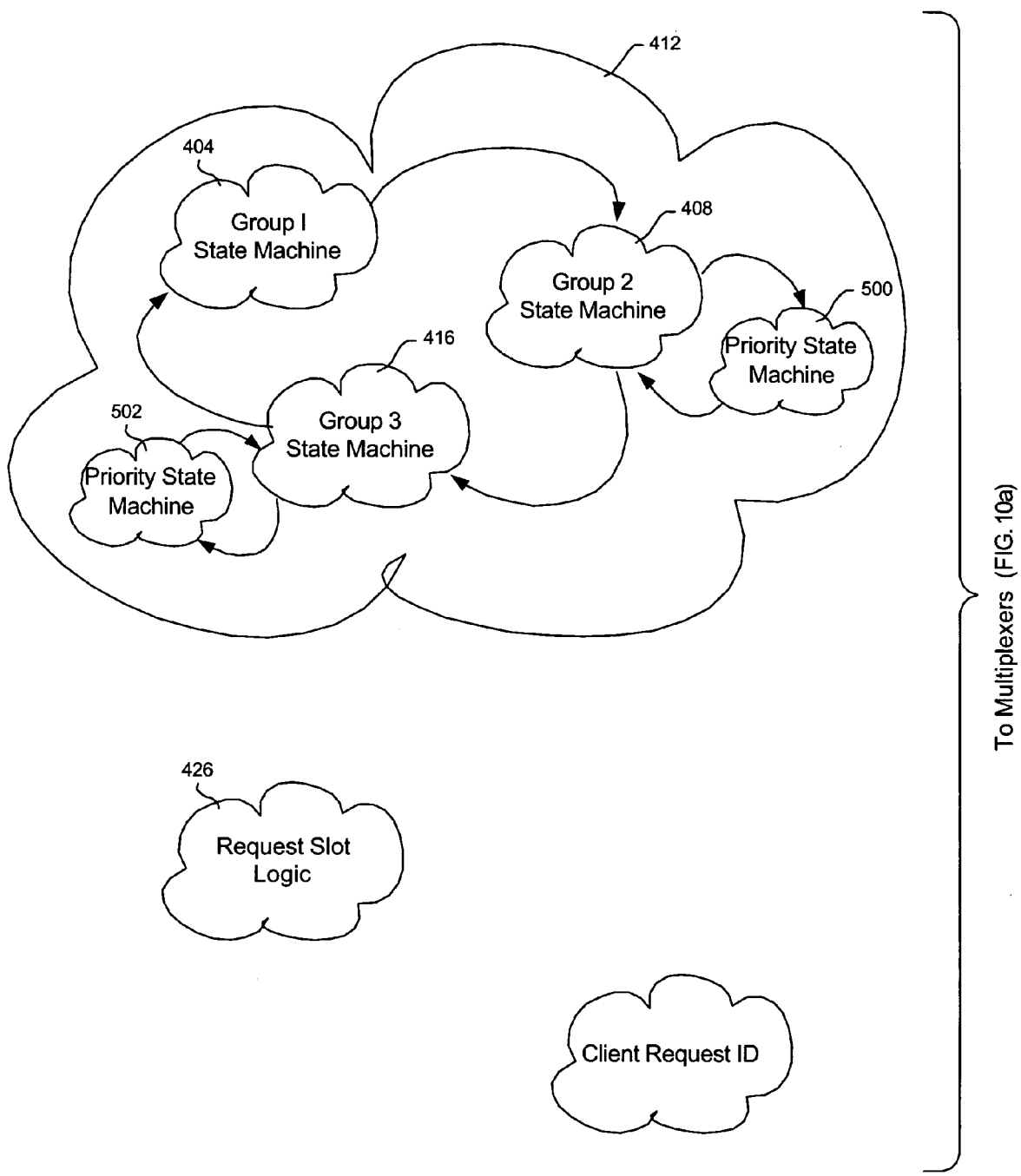

FIGS. 10a and 10b illustrate an example of logic 400 which arbitrates the order in which clients are permitted to place memory requests into the various pipelines and the order in which client requests in the pipelines are permitted access to common memory resources. In the example of FIGS. 10a and 10b, memory operations are classified into four groups, Groups 1, 2, 3 and 4 in which the memory operations of each group are similar. For example, in a TOE application, the PCB memory operations involving PCB data structures may be classified in one group such as Group 1, for example. The Group 1 clients issue memory operations which are designated Request 1A, 1B . . . 1N in FIGS. 10a, 10b, and may include the aforementioned PCB clients, for example. Also, the Packet Data memory operations may be classified into three groups, Group 2 for Packet Data In memory operations, Group 3 for Packet Data Out operations; and Group 4 for Bypass memory operations. The Group 2 clients issue memory operations which are designated Request 2A, 2B . . . 2N in FIGS. 10a, 10b. The Group 3 clients issue memory operations which are designated Request 3A, 3B . . . 3N in FIGS. 10a, 10b. The Group 4 clients issue memory operations which are designated Request 4A, 4B . . . 4N in FIGS. 10a, 10b. It is appreciated that the memory operations of the I/O device may be classified into a greater or lesser number of groups and the classification of the memory operations may vary, depending upon the particular application.

Each Group 1, 2, 3, 4 or type of memory operations may have its own cache at which data may be read from or written to. For example, if the Group 1 memory operations include PCB memory operations, the logic 400 can arbitrate among the PCB memory operations which may be presented by the PCB Group 1 clients, for access to the PCB cache 210 (FIG. 8). Similarly, if the Group 2 memory operations include the Packet Data In memory operations, the logic 400 can arbitrate among the Packet Data In memory operations which may be presented by the Packet Data In Group 2 clients, for access to the Packet Data cache 212 (FIG. 8).

The logic 400 includes a multiplexer 402 which, under the control of an arbitration state machine 404 (FIG. 10b) selects one of the Group 1 memory operations Request 1A, 1B . . . 1N for acceptance into a first pipeline of memory operations. Similarly, the logic 400 includes a multiplexer 406 which, under the control of an arbitration state machine 408 (FIG. 10b) selects one of the Group 2 memory operations Request 2A, 2B . . . 2N for acceptance into a second pipeline of memory operations. In the illustrated embodiment, the multiplexer 406 has an input for a high priority memory operation which, in the example of FIG. 10a, is designated Request 2A. This high priority memory operation may be IP Input Data, for example, in a TOE environment.

The multiplexer 406 has a second input coupled to the output of a multiplexer 409 which under the control of the arbitration state machine 408 (FIG. 10b) selects one of the Group 2 low priority memory operations 2B . . . 2N for forwarding to the multiplexer 406 for acceptance in the second pipeline if accepted by the multiplexer 406.

The logic 400 includes another multiplexer 410 which, under the control of a second, higher level arbitration state machine 412 (FIG. 10b) selects one of the combined Group 1, 2, 3, 4 memory operations, for acceptance into a third pipeline of memory operations. In the illustrated embodiment, the multiplexer 410 has a pair of inputs for a pair of high priority memory operations which, in the example of FIG. 10a, are designated Request 2A, 3A, respectively. These high priority memory operations may be IP Input Data, IP Output Data, respectively, for example, in a TOE environment.

The multiplexer 410 has another input coupled to the output of the multiplexer 402 which under the control of the arbitration state machine 404 (FIG. 10b) selects one of the Group 1 memory operations 1A, 1B . . . 1N for forwarding as described above.

The multiplexer 410 has another input coupled to the output of a multiplexer 414 which under the control of an arbitration state machine 416 (FIG. 10b) selects one of the Group 3 low priority memory operations 3B . . . 3N or one of the Group 4 memory operations 4A, 4B, . . . 4N, for forwarding to the multiplexer 410 for acceptance in the third pipeline if accepted by the multiplexer 410.

In this example, the memory operations of Group 3 and Group 4, such as Packet Data Out and Bypass Data, for example, may be grouped together because they both access the external memory 208 and do not access a cache. However, in alternative embodiments, a cache may be provided for memory operations of these groups as well.

The logic 400 further includes a slot 420 which, in the illustrated embodiment, is a command register, which holds the Group 1 memory request selected by the multiplexer 402 from a Group 1 client until the cache 210 or the external memory 208 is ready to accept it and process it. A temporary slot 422 is loaded with a selected Group 1 memory operation if the Group 1 slot 420 is already full. A multiplexer 424, controlled by a request slot logic 426, selects the Group 1 memory operation from the slot 420 or 422 which is next in line. Thus, the Group 1 slots 420 and 422 permit pipelining of the Group 1 memory operations selected by the multiplexer 402.

A slot 430 holds the Group 2 memory request selected by the multiplexer 406 from a Group 2 client until the cache 212 or the external memory 208 is ready to accept it and process it. A temporary slot 432 is loaded with a selected Group 2 memory operation if the Group 2 slot 430 is already full. A multiplexer 434, controlled by the request slot logic 426, selects the Group 2 memory operation from the slot 430 or 432 which is next in line. Thus, the Group 2 slots 430 and 432 permit pipelining of the Group 2 memory operations selected by the multiplexer 406.

Similarly, a slot 440 holds a Group 1, 2, 3 or 4 memory request selected by the multiplexer 410 until the external memory 208 is ready to accept it and process it. A temporary slot 442 is loaded with the selected Group 1, 2, 3 or 4 memory operation if the slot 430 is already full. A multiplexer 444, controlled by the request slot logic 426, selects the memory operation from the slot 430 or 432 which is next in line. Thus, the slots 430 and 432 permit pipelining of the memory operations selected by the multiplexer 410 which are to be directed to the external memory 208.

Figures 11A, 11B:
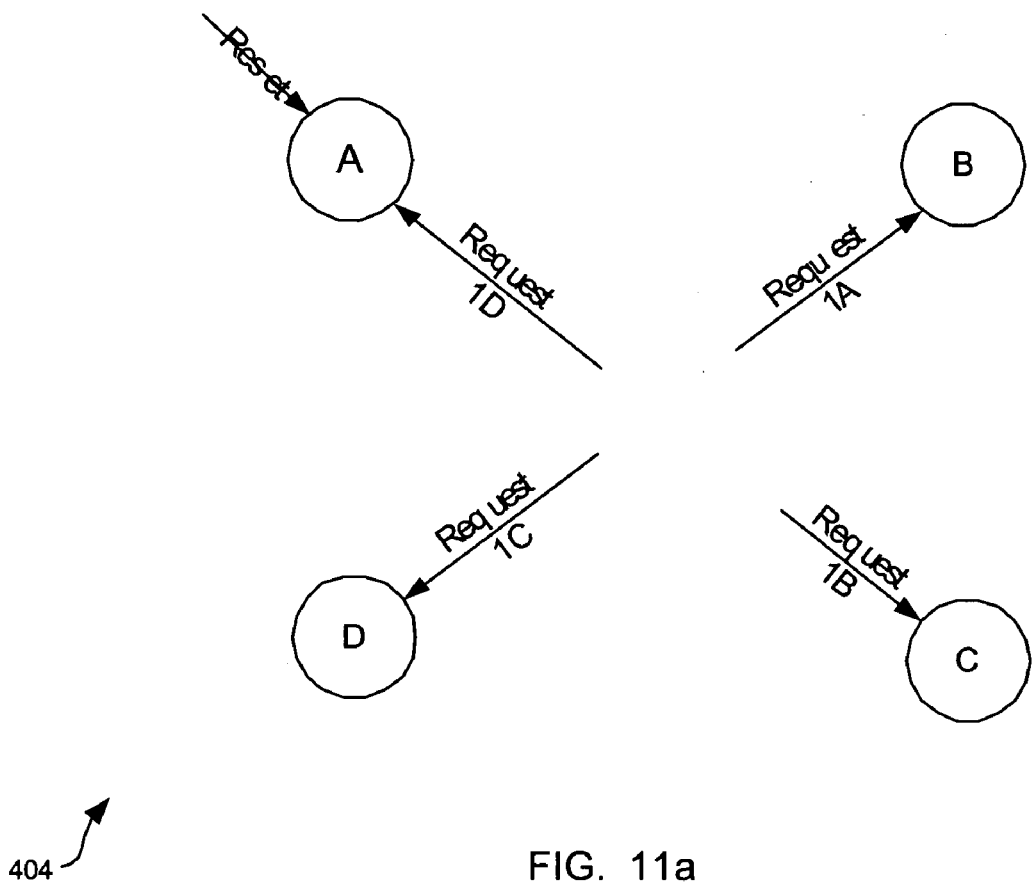
FIGS. 11a and 11b are schematic representations of the operations of a state machine of FIG. 10b in accordance with one embodiment.

FIGS. 11a and 11b illustrates one example of the state machine 404 of Group 1 in greater detail. In this example, the state machine 404 has four states A, B, C, D, one for each of four Group 1 memory operations, 1A, 1B, 1C, 1D, respectively. Four states for four memory operations has been illustrated for simplicity sake. If the Group 1 has more than four memory operations, the state machine 404 may have an additional state for each additional memory operation of the group in this example.

Upon receipt of a new memory operation of Group 1 from one of the Group 1 clients, the memory operation is prioritized within Group 1 using a round robin type arbitration scheme. It is appreciated that other types of arbitration schemes may be used as well.

In operation, if the current state of the state machine 404 is state C, for example, and the client being serviced is the client which provides Group 1 memory operation 1C, then the next state will be state D as shown in FIG. 11a. As shown in the table of FIG. 11b, when the state machine 404 goes to state D, then the memory operation 1D will have the highest priority. Since the memory operation 1C was the memory operation previously serviced, it will have the lowest priority in state D. Accordingly, if the Group 1 client is requesting a memory request 1D, the memory request 1D will be serviced. Thus, the state machine 404 will control the multiplexer 402 to select Request 1D of Group 1 for storage in the slot 420. If the memory request 1D is not being requested by the associated Group 1 client, one of the lower priority requests (Requests 1A, 1B, 1C) of Group 1 may be serviced. Each of the other states will have its own priority ordering wherein each client has top priority in at least one state. Furthermore, the state machine will transition to a state in which the prior client serviced will have lowest priority.

In the example of state machine 404, the clients have equal priority, that is, none of the clients of Group 1 have higher priority than others in the Group 1. Such an arrangement may be suitable for a PCB Group of clients, for example.

In other types of clients, such as Packet Data In or Packet Data Out, it may be appropriate to provide one or more clients of each group a higher priority than other clients of the same group. FIGS. 12a and 12b illustrates one example of the state machine 408 for Group 2 in greater detail. In this example, the state machine 408 has four states A, B, C, D, one for each of four Group 2 memory operations, 2A, 2B, 2C, 2D, respectively. Again, four states for four memory operations has been illustrated for simplicity sake. If the Group 2 has more than four memory operations, the state machine 408 may have an additional state for each additional memory operation of the group in this example.

The state machine 408 works in conjunction with a side state machine 500 (FIG. 12c) which has two states, designated Priority and No Priority, which facilitate providing one of the memory operations of Group 2, such as Group 2 memory operation 2A, for example, a higher priority than other memory operations of Group 2. Upon receipt of a new memory operation from one of the Group 2 clients, the memory operation is prioritized within Group 2 using a round robin type arbitration scheme with an overriding priority for a selected Group 2 memory operation as shown in the table of FIG. 12b. It is appreciated that other types of arbitration schemes may be used as well.

In operation, if the current state of the state machine 408 is state C, for example, and the client being serviced is the client which provides Group 2 memory operation 2C, then the next state will be state D as shown in FIG. 12a. As shown in the table of FIG. 12b, when the state machine 408 goes to state D, then the memory operation 2D will have the highest priority, if the state machine 500 is in the No Priority state for memory operation 2A. Since the memory operation 2C was the memory operation previously serviced, it will have the lowest priority in state D. Accordingly, if a Group 2 client is requesting a memory request 2D, the memory request 2D will be serviced. Thus, the state machine 408 will control the multiplexers 406 and 409 to select Request 2D of Group 2 for storage in the slot 430. If the memory request 2D is not being requested by the associated Group 2 client, one of the lower priority requests (Requests 2A, 2B, 2C) of Group 2 may be serviced.

In the No Priority state, each of the other states will have its own priority ordering wherein each client has top priority in at least one state. Furthermore, the state machine will transition to a state in which the prior client serviced will have lowest priority.

On the other hand, if the state machine 500 is in the Priority state, then when the state machine 408 goes to state D, the memory operation 2A will have the highest priority. The state machine 500 is, in the illustrated embodiment, a programmable priority state machine which includes a register having a programmable count value which determines the priority level for a selected Group 2 memory request which is Group 2 memory request 2A. The Group 2 memory request 2A may be, for example, the IP Input operation, for example. It is appreciated that other memory operations may be selected for high priority treatment.

Upon reset, the state machine 500 goes to the Priority state in which the Group 2 memory request 2A is afforded higher priority by the state machine 408. In addition, the register of the state machine 500 is initialized to a value programmed by the device driver 120, for example. After the memory request 2A is received, the state machine 500 goes to the No Priority state. In this state, the memory request 2A is given the normal round robin priority as shown in the table of FIG. 12b. The state machine 500 stays in this state until the count of the register of the state machine 500 goes to zero. When the count goes to zero, the state machine 500 returns to the Priority state and the memory request 2A is again given highest priority in each of the states A, B, C, D of the state machine 408.

In the illustrated embodiment, the register of the state machine 500 is a 4 bit binary counter which determines how frequently a high priority client such as IP Input, for example, gets serviced or, in other words, the minimum memory bandwidth allocated for the high priority client. In one embodiment, the register count value is seven and is loaded into the register on reset. A count of seven provides a minimum memory bandwidth of approximately 15%. Other count values can provide other minimum memory bandwidths for a high priority client.

The state machine 416 operates in a similar manner for the memory requests of Groups 3 and 4 which may be the Packet Data Out and Bypass clients, respectively. The state machine 416 works in conjunction with a side state machine 502 (FIG. 10b) which has two states Priority and No Priority which facilitate providing one of the memory operations of Group 3 or 4 such as the IP Output client, for example, a higher priority than other memory operations of Groups 2 and 4.

Figures 13A, 13B:
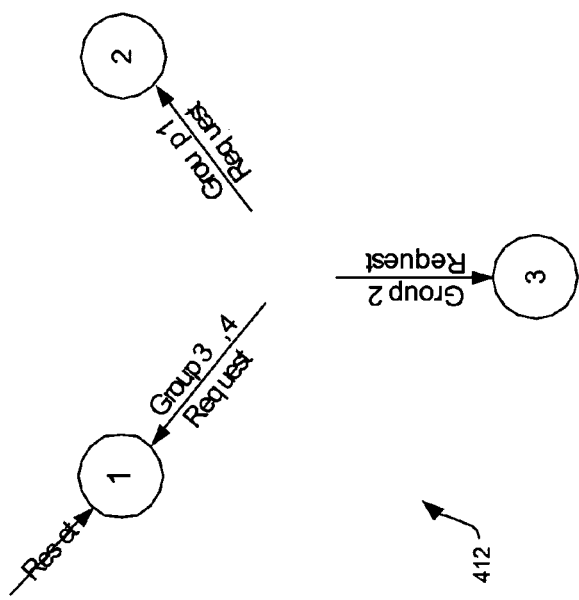
FIGS. 13a and 13b are schematic representations of the operations of another example of a state machine of FIG. 10b in accordance with one embodiment.

A second, higher level arbitration may be performed by the state machine 412 which arbitrates among the clients which were selected by the lower level state machines 404, 408, 416 for the individual groups. FIGS. 13a and 13b illustrate one example of the state machine 412 for Groups 1-4 in greater detail. In this example, the state machine 412 has three states, state 1 for client Group 1, state 2 for client Group 2, and state 3 for client Groups 3 and 4. Again, three states has been illustrated for simplicity sake. If the I/O device has more groups of memory operations, the state machine 412 could have an additional state for each additional group of memory operations in this example. In addition, if not all groups are competing for the common resource, states for those noncompeting groups may be eliminated as well.

Upon receipt of a new memory operation from one of the Groups 1-4 clients, the memory operation is prioritized using a round robin type arbitration scheme with an overriding priority for selected Group 2 and Group 3 memory operations as shown in the table of FIG. 13b. It is appreciated that other types of arbitration schemes may be used as well.

In operation, if the current state of the state machine 408 is state 1, for example, and the client being serviced is a client from the client Group 1, for example, then the next state will be state 2 as shown in FIG. 13a. As shown in the table of FIG. 13b, when the state machine 408 goes to state 2, then the memory operation of Group 2 which was selected by the Group 2 state machine 408 will have the highest priority, unless one of the higher priority memory requests of Groups 2 or 3 has also been requested. Thus, as shown in the table of FIG. 13b, when the state machine 408 goes to state 2, then the higher priority memory request 2A of the client Group 2 will be selected by the multiplexer 410 and stored in the slot 440 if the memory request 2A has been requested. If not, the higher priority memory request 3A of the client Group 3 will be selected and stored if the memory request 3A has been requested. If neither higher priority memory request has been requested, a memory request of Group 2 which was selected by the Group 2 state machine 408 will have the highest priority and will be selected by the multiplexer 410 and stored in the slot 440. Since the memory request from Group 1 was the memory operation previously serviced, the memory request selected by the Group 1 state machine 404 will have the lowest priority in state 2 of the state machine.

Each of the other states 1, 3 will have its own priority ordering wherein a client from each group, 1, 2 or the combined groups 3 and 4, has top priority in at least one state unless of the higher priority clients 2A or 3A has been requested. Furthermore, the state machine will transition to a state in which the group of the prior client serviced will have lowest priority unless it is one of the higher priority clients 2A, 3A.

In the illustrated embodiment, the network adapter 112 was described as having a novel architecture for memory operations. Other applications include other I/O devices such as the storage controller 109.

Additional Embodiment Details

The described techniques for managing memory may be embodied as a method, apparatus or article of manufacture using standard programming and/or engineering techniques to produce software, firmware, hardware, or any combination thereof. The term "article of manufacture" as used herein refers to code or logic embodied in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and nonvolatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are employed may further be accessible through a transmission media or from a file server over a network. In such cases, the article of manufacture in which the code is embodied may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any information bearing medium known in the art.

In the described embodiments, certain operations were described as being performed by the operating system 110, system host, device driver 120, or the network interface 112. In alterative embodiments, operations described as performed by one of these may be performed by one or more of the operating system 110, device driver 120, or the network interface 112. For example, memory operations described as being performed by the driver may be performed by the host.

In the described embodiments, a transport protocol layer 121 and an RDMA protocol layer were embodied in the network adapter 112 hardware. In alternative embodiments, the transport protocol layer or the RDMA protocol layer may be embodied in the device driver or host memory 106.

In certain embodiments, the device driver and network adapter embodiments may be included in a computer system including a storage controller, such as a SCSI, Integrated Drive Electronics (IDE), RAID, etc., controller, that manages access to a non-volatile storage device, such as a magnetic disk drive, tape media, optical disk, etc. In alternative embodiments, the network adapter embodiments may be included in a system that does not include a storage controller, such as certain hubs and switches.

In certain embodiments, the device driver and network adapter embodiments may be embodied in a computer system including a video controller to render information to display on a monitor coupled to the computer system including the device driver and network adapter, such as a computer system comprising a desktop, workstation, server, mainframe, laptop, handheld computer, etc. Alternatively, the network adapter and device driver embodiments may be employed in a computing device that does not include a video controller, such as a switch, router, etc.

In certain embodiments, the network adapter may be configured to transmit data across a cable connected to a port on the network adapter. Alternatively, the network adapter embodiments may be configured to transmit data over a wireless network or connection, such as wireless LAN, Bluetooth, etc.

The illustrated logic of FIGS. 7, 9 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 14:
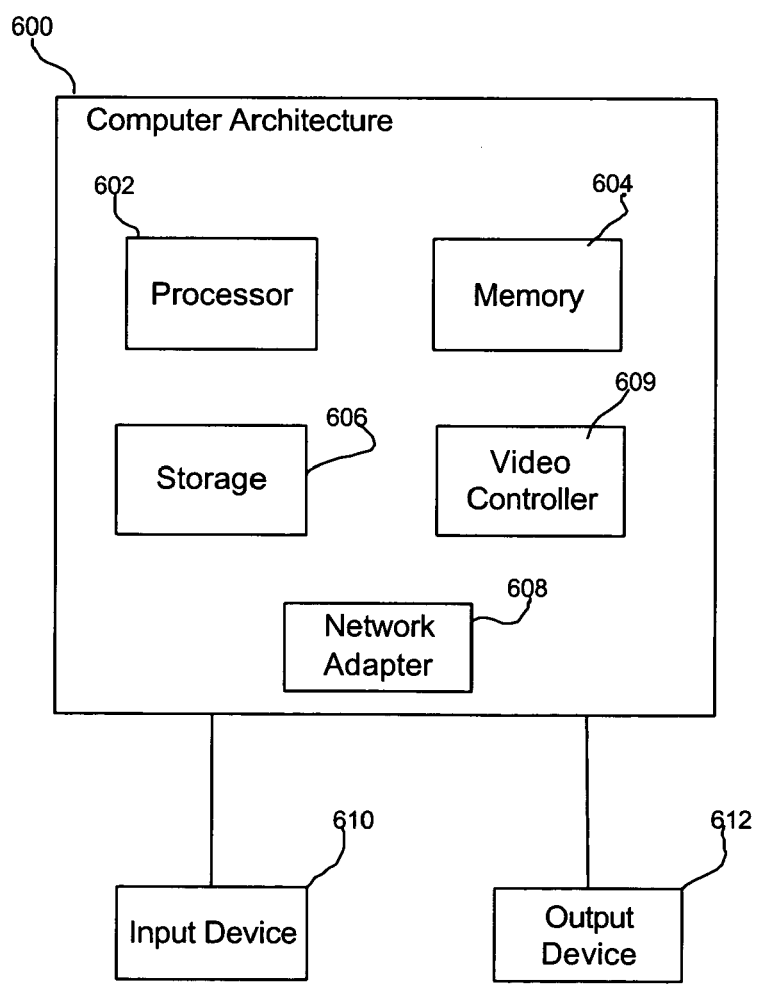
FIG. 14 illustrates an architecture that may be used with the described embodiments.

FIG. 14 illustrates one embodiment of a computer architecture 600 of the network components, such as the hosts and storage devices shown in FIG. 4. The architecture 600 may include a processor 602 (e.g., a microprocessor), a memory 604 (e.g., a volatile memory device), and storage 606 (e.g., a nonvolatile storage, such as magnetic disk drives, optical disk drives, a tape drive, etc.). The storage 606 may comprise an internal storage device or an attached or network accessible storage. Programs in the storage 606 are loaded into the memory 604 and executed by the processor 602 in a manner known in the art. The architecture further includes a network adapter 608 to enable communication with a network, such as an Ethernet, a Fibre Channel Arbitrated Loop, etc. Further, the architecture may, in certain embodiments, include a video controller 609 to render information on a display monitor, where the video controller 609 may be embodied on a video card or integrated on integrated circuit components mounted on the motherboard. As discussed, certain of the network devices may have multiple network cards or controllers. An input device 610 is used to provide user input to the processor 602, and may include a keyboard, mouse, pen-stylus, microphone, touch sensitive display screen, or any other activation or input mechanism known in the art. An output device 612 is capable of rendering information transmitted from the processor 602, or other component, such as a display monitor, printer, storage, etc.

The network adapter 608 may be embodied on a network expansion card such as a Peripheral Component Interconnect (PCI) card or some other I/O card coupled to a motherboard, or on integrated circuit components mounted on the motherboard. The host interface may employ any of a number of protocols including PCI EXPRESS.

Details on the PCI architecture are described in "PCI Local Bus, Rev. 2.3", published by the PCI-SIG. Details on the TCP protocol are described in "Internet Engineering Task Force (IETF) Request for Comments (RFC) 793," published September 1981 and details on the IP protocol are described in "Internet Engineering Task Force Request for Comments (RFC) 791, published September 1981. Details on the UDP protocol are described in "Internet Engineering Task Force Request for Comments (RFC) 798, published August, 1980. Details on the Fibre Channel architecture are described in the technology specification "Fibre Channel Framing and Signaling Interface", document no. ISO/IEC AWI 14165-25. Details on the Ethernet protocol are described in "IEEE std. 802.3," published Mar. 8, 2002. Details on the RDMA protocol are described in the technology specification "Architectural Specifications for RDMA over TCP/IP" Version 1.0 (October 2003).

The foregoing description of various embodiments have been presented for the purposes of illustration and description. It is not intended to be exhaustive or to limit to the precise form disclosed. Many modifications and variations are possible in light of the above teaching. It is intended that the scope not be limited not by this detailed description.

What is claimed is:

1. A method, comprising:

transmitting network connection context data through a network connection context data bus between a network adapter memory controller and a network connection context data client of a group of network connection context data clients of a network adapter; and separately transmitting packet data through a packet data bus between said memory controller and a packet data client of a group of packet data clients of said network adapter wherein said network connection context data bus is separate from said packet data bus, wherein said transmitting network connection context data includes reading network connection context data through a unidirectional network connection context data read bus from said memory controller to a client of said group of network connection context data clients; and said transmitting packet data includes reading packet data on a unidirectional packet data read bus from said memory controller to a client of said group of packet data clients, and wherein said transmitting network connection context data includes writing network connection context data through a unidirectional network connection context data write bus from a client of said group of network connection context data clients to said memory controller; and said transmitting packet data includes writing packet data through a unidirectional packet data write bus from a client of said group of packet data clients to said network controller.

2. The method of claim 1 wherein said transmitting network connection context data includes transmitting network connection context data through said network connection context data bus between a client of said group of network connection context data clients and a network connection context data cache of said network adapter; and said transmitting packet data includes transmitting packet data through said packet data bus between a client of said group of packet data clients and a packet data cache of said network adapter.

3. The method of claim 1 further comprising:

issuing a first memory request from a client of one of said client groups to a memory controller of said network adapter, and directed toward a target memory;

after issuing said first memory request, issuing a second memory request from a client of said one client groups to said memory controller, and directed toward a target memory; and after issuing said second memory request, transferring data requested by said first memory request between a target memory and the client which issued the first memory request.

4. The method of claim 3 further comprising issuing a first acknowledgement for said first memory request; wherein said second memory request is issued in response to said first acknowledgement and prior to said data transfer for said first memory request.

5. The method of claim 4 further comprising receiving by the client which issued the first memory request, a memory operation grant for said first memory request wherein said data is transferred in response to said memory operation grant.

6. The method of claim 5 further comprising said memory controller:

holding said first memory request in a register;

in response to said memory operation grant, releasing said first memory request; and forwarding said first memory request to the target memory of said first memory request; and storing client identifier information for said first memory request.

7. The method of claim 6 further comprising identifying the client which issued said first memory request using said stored identifier information and forwarding read data to the identified client.

8. The method of claim 1 further comprising:

a plurality of clients of said group of network connection context data clients requesting transmission of network connection context data through said network connection context data bus; and arbitrating in a round robin among the requesting clients of said group of network connection context data clients which have requested the transmission of network connection context data through a network connection context data bus.

9. The method of claim 8 further comprising:
a plurality of clients of said group of packet data clients requesting transmission of packet data through said packet data bus; and
arbitrating in a round robin among the requesting clients of said group of packet data clients which have requested the transmission of packet data through said packet data bus.

10. The method of claim 9 further comprising providing one of said packet data clients a programmable higher priority than other clients of said group of packet data clients wherein said programmable higher priority is a function of a count value stored in a counter.

11. The method of claim 1 further comprising a plurality of clients of a plurality of groups of clients of a network adapter requesting transmission of data through an external data bus between a network adapter memory controller and an external memory external to said network adapter, said method further comprising arbitrating in a round robin among the groups of the clients which have requested the transmission of data through said external bus.

12. The method of claim 11 further comprising providing at least one of said clients requesting transmission of data through said external data bus a higher priority than other clients requesting transmission of data through said external data bus.

13. An article comprising a storage medium, the storage medium comprising machine readable instructions stored thereon to:
transmit network connection context data through a network connection context data bus between a network adapter memory controller and a network connection context data client of a group of network connection context data clients of a network adapter; and
separately transmit packet data through a packet data bus between said memory controller and a packet data client of a group of packet data clients of said network adapter wherein said network connection context data bus is separate from said packet data bus,
wherein said transmitting network connection context data includes reading network connection context data through a unidirectional network connection context data read bus from said memory controller to a client of said group of network connection context data clients; and
said transmitting packet data includes reading packet data on a unidirectional packet data read bus from said memory controller to a client of said group of packet data clients; and
wherein said transmitting network connection context data includes writing network connection context data through a unidirectional network connection context data write bus from a client of said group of network connection context data clients to said memory controller; and
said transmitting packet data includes writing packet data through a unidirectional packet data write bus from a client of said group of packet data clients to said network controller.

14. The article of claim 13 wherein said transmitting network connection context data includes writing network connection context data through a unidirectional network connection context data write bus from a client of said group of network connection context data clients to said memory controller; and
said transmitting packet data includes writing packet data through a unidirectional packet data write bus from a client of said group of packet data clients to said network controller.

15. The article of claim 13 wherein the storage medium further comprises machine readable instructions stored thereon to:
issue a first memory request from a client of one of said client groups to a memory controller of said network adapter, and directed toward a target memory;
after issuing said first memory request, issue a second memory request from a client of said one client groups to said memory controller, and directed toward a target memory; and
after issuing said second memory request, transfer data requested by said first memory request between a target memory and the client which issued the first memory request.

16. The article of claim 15 wherein the storage medium further comprises machine readable instructions stored thereon to issue a first acknowledgement for said first memory request; wherein said second memory request is issued in response to said first acknowledgement and prior to said data transfer for said first memory request.

17. The article of claim 16 wherein the storage medium further comprises machine readable instructions stored thereon to receive by the client which issued the first memory request, a memory operation grant for said first memory request wherein said data is transferred in response to said memory operation grant.

18. The article of claim 17 wherein the storage medium further comprises machine readable instructions stored thereon for said memory controller to:
hold said first memory request in a register;
in response to said memory operation grant, release said first memory request; and forward said first memory request to the target memory of said first memory request; and
store client identifier information for said first memory request.

19. The article of claim 18 wherein the storage medium further comprises machine readable instructions stored thereon to identify the client which issued said first memory request using said stored identifier information and forward read data to the identified client.

20. The article of claim 13 wherein a plurality of clients of said group of network connection context data clients request transmission of network connection context data through said network connection context data bus and wherein the storage medium further comprises machine readable instructions stored thereon to:
arbitrate in a round robin among the requesting clients of said group of network connection context data clients which have requested the transmission of network connection context data through a network connection context data bus.

21. The article of claim 20 wherein a plurality of clients of said group of packet data clients request transmission of packet data through said packet data bus, and wherein the storage medium further comprises machine readable instructions stored thereon to:
arbitrate in a round robin among the requesting clients of said group of packet data clients which have requested the transmission of packet data through said packet data bus.

22. The article of claim 21 wherein the storage medium further comprises machine readable instructions stored thereon to:
  provide one of said packet data clients a programmable higher priority than other clients of said group of packet data clients wherein said programmable higher priority is a function of a count value stored in a counter.

23. The article of claim 13 wherein a plurality of clients of a plurality of groups of clients of a network adapter request transmission of data through an external data bus between a network adapter memory controller and an external memory external to said network adapter, and wherein the storage medium further comprises machine readable instructions stored thereon to:
  arbitrate in a round robin among the groups of the clients which have requested the transmission of data through said external bus.

24. The article of claim 23 wherein the storage medium further comprises machine readable instructions stored thereon to:
  provide at least one of said clients requesting transmission of data through said external data bus a higher priority than other clients requesting transmission of data through said external data bus.

25. A system for use with a network, comprising:
  at least one system memory which includes an operating system;
  a motherboard;
  a processor mounted on the motherboard and coupled to the memory;
  an expansion card coupled to said motherboard;
  a network adapter mounted on said expansion card and comprising a memory controller and having a group of network connection context data clients and a group of packet data clients, said adapter further comprising a network connection context data bus between said network adapter memory controller and said group of network connection context data clients, and a separate packet data bus between said memory controller and said group of packet data clients; and
  a device driver executable by the processor in the system memory for said network adapter, wherein the network adapter is adapted to:
  transmit network connection context data through said network connection context data bus between said network adapter memory controller and a network connection context data client of said group of network connection context data clients; and
  separately transmit packet data through said packet data bus between said memory controller and a packet data client of said group of packet data clients of said network adapter, wherein said network adapter has a unidirectional network connection context data read bus from said memory controller to said group of network connection context data clients, and a unidirectional packet data read bus from said memory controller to said group of packet data clients, and
  wherein said transmitting network connection context data includes reading network connection context data through said unidirectional network connection context data read bus from said memory controller to a client of said group of network connection context data clients; and
  said transmitting packet data includes reading packet data on said unidirectional packet data read bus from said memory controller to a client of said group of packet data clients; and
  wherein said network adapter has a unidirectional network connection context data write bus from said group of network connection context data clients to said memory controller, and a unidirectional packet data write bus from a client of said group of packet data clients to said network controller, and wherein said transmitting network connection context data includes writing network connection context data through said unidirectional network connection context data write bus from a client of said group of network connection context data clients to said memory controller; and
  said transmitting packet data includes writing packet data through said unidirectional packet data write bus from a client of said group of packet data clients to said network controller.

26. The system of claim 25 wherein said network adapter has a network connection context data cache and a packet data cache and wherein said transmitting network connection context data includes transmitting network connection context data through said network connection context data bus between a client of said group of network connection context data clients and said network connection context data cache of said network adapter; and
  said transmitting packet data includes transmitting packet data through said packet data bus between a client of said group of packet data clients and said packet data cache of said network adapter.

27. The system of claim 25 wherein the network adapter has at least one associated target memory and wherein said network adapter is further adapted to:
  issue a first memory request from a client of one of said client groups to said memory controller of said network adapter, and directed toward a target memory;
  after issuing said first memory request, issue a second memory request from a client of said one client groups to said memory controller, and directed toward a target memory; and
  after issuing said second memory request, transfer data requested by said first memory request between a target memory and the client which issued the first memory request.

28. The system of claim 27 wherein the network adapter is further adapted to issue a first acknowledgement for said first memory request; wherein said second memory request is issued in response to said first acknowledgement and prior to said data transfer for said first memory request.

29. The system of claim 28 wherein the network adapter is further adapted to receive by the client which issued the first memory request, a memory operation grant for said first memory request wherein said data is transferred in response to said memory operation grant.

30. The system of claim 29 wherein the network adapter has at least one register and is further adapted to:
  hold said first memory request in a register;
  in response to said memory operation grant, release said first memory request; and forward said first memory request to the target memory of said first memory request; and
  store client identifier information for said first memory request.

31. The system of claim 30 wherein the network adapter is further adapted to identify the client which issued said first memory request using said stored identifier information and forward read data to the identified client.

32. The system of claim 25 wherein said network adapter is further adapted to:
   permit a plurality of clients of said group of network connection context data clients to request transmission of network connection context data through said network connection context data bus the storage medium, and
   arbitrate in a round robin among the requesting clients of said group of network connection context data clients which have requested the transmission of network connection context data through a network connection context data bus.

33. The system of claim 32 wherein said network adapter is further adapted to:
   permit a plurality of clients of said group of packet data clients to request transmission of packet data through said packet data bus, and
   arbitrate in a round robin among the requesting clients of said group of packet data clients which have requested the transmission of packet data through said packet data bus.

34. The system of claim 33 wherein the network adapter has a counter and is further adapted to:
   provide one of said packet data clients a programmable higher priority than other clients of said group of packet data clients wherein said programmable higher priority is a function of a count value stored in said counter.

35. The system of claim 25 wherein the network adapter is further adapted to:
   permit a plurality of clients of a plurality of groups of clients to request transmission of data through an external data bus between a network adapter memory controller and an external memory external to said network adapter, and
   arbitrate in a round robin among the groups of the clients which have requested the transmission of data through said external bus.

36. The system of claim 35 wherein the network adapter is further adapted to:
   provide at least one of said clients requesting transmission of data through said external data bus a higher priority than other clients requesting transmission of data through said external data bus.

37. A device for use with a network, comprising:
   a network controller comprising a memory controller and having a group of network connection context data clients and a group of packet data clients, said network controller further comprising a network connection context data bus between said network controller memory controller and said group of network connection context data clients, and a separate packet data bus between said memory controller and said group of packet data clients, wherein the network controller is adapted to:
   transmit network connection context data through said network connection context data bus between said network controller memory controller and a network connection context data client of said group of network connection context data clients; and
   separately transmit packet data through said packet data bus between said memory controller and a packet data client of said group of packet data clients of said network controller,
   wherein said network controller has a unidirectional network connection context data read bus from said memory controller to said group of network connection context data clients, and a unidirectional packet data read bus from said memory controller to said group of packet data clients, and wherein said transmitting network connection context data includes reading network connection context data through said unidirectional network connection context data read bus from said memory controller to a client of said group of network connection context data clients; and
   said transmitting packet data includes reading packet data on said unidirectional packet data read bus from said memory controller to a client of said group of packet data clients, and
   wherein said network controller has a unidirectional network connection context data write bus from said group of network connection context data clients to said memory controller, and a unidirectional packet data write bus from a client of said group of packet data clients to said network controller, and wherein said transmitting network connection context data includes writing network connection context data through said unidirectional network connection context data write bus from a client of said group of network connection context data clients to said memory controller; and
   said transmitting packet data includes writing packet data through said unidirectional packet data write bus from a client of said group of packet data clients to said network controller.

38. The device of claim 37 wherein said network controller has a network connection context data cache and a packet data cache and wherein said transmitting network connection context data includes transmitting network connection context data through said network connection context data bus between a client of said group of network connection context data clients and said network connection context data cache of said network controller; and
   said transmitting packet data includes transmitting packet data through said packet data bus between a client of said group of packet data clients and said packet data cache of said network controller.

39. The device of claim 37 wherein the network controller has at least one associated target memory and wherein said network controller is further adapted to:
   issue a first memory request from a client of one of said client groups to said memory controller of said network controller, and directed toward a target memory;
   after issuing said first memory request, issue a second memory request from a client of said one client groups to said memory controller, and directed toward a target memory; and
   after issuing said second memory request, transfer data requested by said first memory request between a target memory and the client which issued the first memory request.

40. The device of claim 39 wherein the network controller is further adapted to issue a first acknowledgement for said first memory request; wherein said second memory request is issued in response to said first acknowledgement and prior to said data transfer for said first memory request.

41. The device of claim 40 wherein the network controller is further adapted to receive by the client which issued the first memory request, a memory operation grant for said first memory request wherein said data is transferred in response to said memory operation grant.

42. The device of claim 41 wherein the network controller has at least one register and is further adapted to:
   hold said first memory request in a register;
   in response to said memory operation grant, release said first memory request; and forward said first memory request to the target memory of said first memory request; and store client identifier information for said first memory request.

43. The device of claim 42 wherein the network controller is further adapted to identify the client which issued said first memory request using said stored identifier information and forward read data to the identified client.

44. The device of claim 37 wherein said network controller is further adapted to:
   permit a plurality of clients of said group of network connection context data clients to request transmission of network connection context data through said network connection context data bus the storage medium, and
   arbitrate in a round robin among the requesting clients of said group of network connection context data clients which have requested the transmission of network connection context data through a network connection context data bus.

45. The device of claim 44 wherein said network controller is further adapted to:
   permit a plurality of clients of said group of packet data clients to request transmission of packet data through said packet data bus, and
   arbitrate in a round robin among the requesting clients of said group of packet data clients which have requested the transmission of packet data through said packet data bus.

46. The device of claim 45 wherein the network controller has a counter and is further adapted to:
   provide one of said packet data clients a programmable higher priority than other clients of said group of packet data clients wherein said programmable higher priority is a function of a count value stored in said counter.

47. The device of claim 37 wherein the network controller is further adapted to:
   permit a plurality of clients of a plurality of groups of clients to request transmission of data through an external data bus between a network controller memory controller and an external memory external to said network controller, and
   arbitrate in a round robin among the groups of the clients which have requested the transmission of data through said external bus.

48. The device of claim 47 wherein the network controller is further adapted to:
   provide at least one of said clients requesting transmission of data through said external data bus a higher priority than other clients requesting transmission of data through said external data bus.

* * * * *